United States Patent
Patel et al.

(10) Patent No.: US 7,670,528 B2
(45) Date of Patent: Mar. 2, 2010

(54) HIGH FLOW FLUID FILTRATION SYSTEMS AND METHODS FOR MANUFACTURING SAME

(75) Inventors: Mahesh Z. Patel, Plantsville, CT (US); Jonathan C. Taylor, Austin, TX (US); Gary W. Schukar, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 31 days.

(21) Appl. No.: 12/048,092

(22) Filed: Mar. 13, 2008

(65) Prior Publication Data
US 2008/0246182 A1    Oct. 9, 2008

Related U.S. Application Data

(60) Provisional application No. 60/895,357, filed on Mar. 16, 2007.

(51) Int. Cl.
*B31F 1/20* (2006.01)
(52) U.S. Cl. ................................ 264/287; 264/286
(58) Field of Classification Search ............... 264/286, 264/287; 425/336, 393, 303
See application file for complete search history.

(56) References Cited

U.S. PATENT DOCUMENTS

| | | | | |
|---|---|---|---|---|
| 1,009,528 A | * | 11/1911 | Kennedy | 425/115 |
| 1,571,594 A | * | 2/1926 | Lorenz | 425/336 |
| 1,928,049 A | | 9/1933 | Danills | |
| 2,068,031 A | * | 1/1937 | Mattinson | 264/168 |
| 2,068,133 A | * | 1/1937 | Hindall | 156/462 |
| 2,186,440 A | | 1/1940 | Williams | |
| 2,253,718 A | * | 8/1941 | McKeage | 428/167 |
| 2,556,521 A | * | 6/1951 | Chase | 210/458 |
| 2,683,537 A | | 7/1954 | Dobrolet | |
| 2,732,951 A | | 1/1956 | DePuiffe De Magondeau | |
| 2,876,555 A | * | 3/1959 | Vander Pyl, Jr. | 34/464 |
| 2,897,971 A | | 8/1959 | Gewiss | |
| 3,087,623 A | | 4/1963 | Gewiss | |
| 3,246,058 A | * | 4/1966 | Voelker | 264/46.2 |
| 3,311,526 A | * | 3/1967 | Barany | 425/396 |
| 3,375,565 A | * | 4/1968 | Sausik | 425/393 |
| 3,607,583 A | * | 9/1971 | Geschwender | 425/112 |

(Continued)

*Primary Examiner*—Joseph S Del Sole
*Assistant Examiner*—David N Brown, II
(74) *Attorney, Agent, or Firm*—Aleksander Medved

(57) ABSTRACT

The present disclosure is directed to systems and methods of manufacturing filter cartridges are disclosed, the system including a tube of laminated and seamed filter media, a media unwind mechanism, a mandrel having a starting point operatively positioned proximate the media unwind mechanism, structure, operatively positioned proximate the mandrel, for feeding the tube of laminated and seamed filter media into the starting point of the mandrel, structure, operatively positioned in the mandrel, for pressurizing the tube of laminated and seamed filter media with a gas, structure, operatively positioned in the mandrel, for expanding the tube of laminated and seamed filter media into a substantially cylindrical shape as the tube of laminated and seamed filter media passes over the mandrel, a pleater mechanism, operatively positioned proximate the mandrel, a blade mechanism, operatively associated with the pleater mechanism, for alternately engaging the tube of laminated and seamed filter media with the blade mechanism, structure, operatively positioned proximate the pleater mechanism, for moving newly formed pleated filter media downstream; and structure for compressing the tube of laminated and seamed filter media radially toward the mandrel. Methods of manufacturing filter cartridges are also disclosed.

20 Claims, 10 Drawing Sheets

U.S. PATENT DOCUMENTS

| | | |
|---|---|---|
| 3,867,294 A * | 2/1975 | Pall et al. ............... 210/489 |
| 4,028,252 A * | 6/1977 | Morris ............... 210/321.77 |
| 4,075,736 A * | 2/1978 | Riegler ............... 452/25 |
| 4,198,366 A * | 4/1980 | Luboshez ............... 264/129 |
| 4,594,162 A * | 6/1986 | Berger ............... 210/493.1 |
| 4,701,120 A * | 10/1987 | Kesselring ............... 425/369 |
| 4,798,575 A * | 1/1989 | Siversson ............... 493/346 |
| 4,842,739 A | 6/1989 | Tang |
| 5,135,461 A * | 8/1992 | Corey et al. ............... 493/7 |
| 5,336,405 A | 8/1994 | Tang et al. |
| 5,702,603 A | 12/1997 | Johnson et al. |
| 2008/0246182 A1 * | 10/2008 | Patel et al. ............... 264/259 |

* cited by examiner

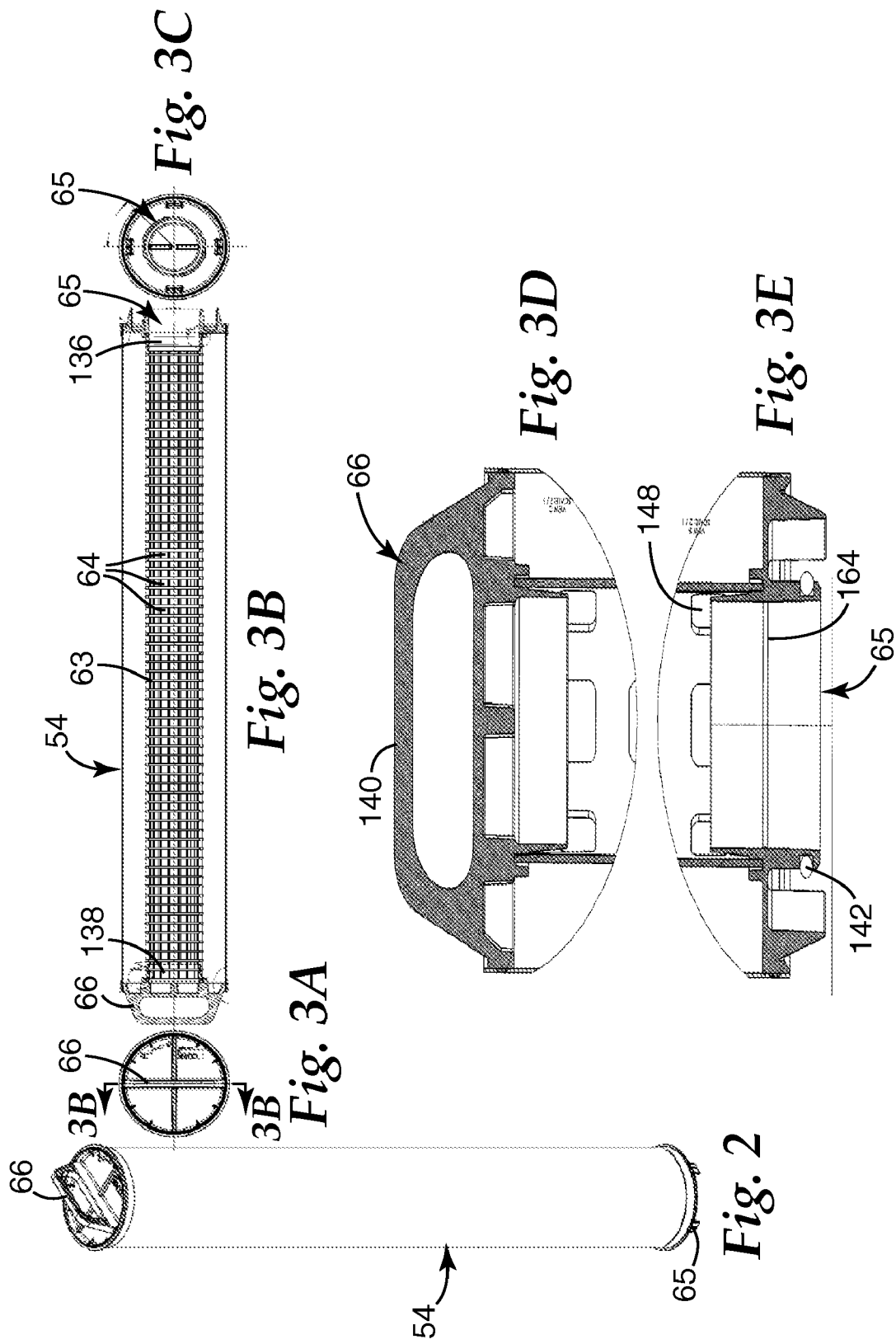

HIGH FLOW FLUID FILTRATION SYSTEMS AND METHODS FOR MANUFACTURING SAME

RELATED APPLICATION

The present application claims the benefit of U.S. Provisional Application No. 60/895,357 filed Mar. 16, 2007, which is incorporated herein in its entirety by reference.

BACKGROUND

The present disclosure relates to high flow cartridges, more particularly to replaceable filter cartridges for gas or liquid filtration applications, yet more particularly to a diamond patterned tubular pleated filter element that packs higher usable media surface areas per unit volume than can be achieved with many conventional pleated filter media cartridge filters and even more particularly to the diamond patterned tubular pleated filter elements used in the filter cartridge.

Efforts to provide high flow fluid filtration systems and systems for manufacturing high flow fluid filtration systems including cartridge filters having relatively high flow rate cartridge filters with flow rates up to about 500 gpm (1893 lpm) through a single filter cartridge and systems related thereto have recently been undertaken. Prior efforts (See U.S. Pat. Nos. 4,842,739 and 5,336,405) resulted in a relative increase in the effective filter media area while minimizing filtration cartridge size and led to a variety of filter cartridge arrangements in which a flat filter media sheet is folded into pleated structures and placed in a filter cartridge.

One of the competitive technologies to the subject matter of the present disclosure is filter cartridges containing radially pleated filter media. Among the disadvantage of radial pleating, when used in the applications contemplated by the filter cartridges of the present disclosure, is the amount of filter media area that can be contained within a single filter cartridge. For example, one currently commercially available filter cartridge (as a product available from CUNO Incorporated, a 3M Company, under the tradename BETAFINE XL) has the capacity to pack higher amounts of filter media than can be packed into currently known similar two and five tenths inch (2.5 inch) (6 cm) outer diameter filter cartridges but, even with the increased filter media packing, still needs a greater number of filter cartridges than needed by certain embodiments of the present disclosure.

The filter cartridges described in U.S. Pat. Nos. 4,842,739 and 5,336,405 comprise a relatively high surface area of filter media per unit volume of cartridge but the inner core diameter of these filter cartridges is about one and five tenths inch (1.5 inches) (4 cm). One of the limitations associated with this particular filter cartridge, commonly known as the 3M model number 740B series filter cartridge products, is that the flow rate per filter cartridge is limited to a maximum of about eighty (80) gpm (303 lpm) due to the about one and five tenths inch (1.5 inch) (4 cm) inner core diameter of this particular filter cartridge. Thus, this particular prior art filter cartridge exhibits performance limitations effecting its potential market penetration into the high flow filtration application market.

Many of the prior art patents including U.S. Pat. Nos. 2,683,537, 2,897,971, 3,087,623, 2,732,951, 2,556,521, 2,186,440, 1,928,049, 5,336,405, 5,702,603, 2,683,537 3,867,294 and 2,186,440 utilize paper filter media and/or cartridges that are used for filtering engine oil while the filter media used in the filter cartridge of the present disclosure utilizes in certain embodiments meltblown media made out of polyolefin material such as, for example, polypropylene or an equivalent material.

Thus, it is desirable to provide exemplary high flow fluid filtration systems and methods and systems for manufacturing high flow fluid filtration systems including, but not limited to, filter housings for enclosing at least one filter cartridge, a filter cartridge having a pleated filter media element pack which has the capacity to process a relatively higher liquid flow rate per filter cartridge, for example, about 50 gpm (189 lpm) or higher than similar known prior art filter cartridges, such as 3M model number 740B series filter cartridges; which, in one embodiment, provides a filter media area of about 145 square feet (13 $m^2$) for a given filter cartridge internal volume of about 1327 cubic inches (21745 $cm^3$) for a forty (40) inch (100 cm) length cartridge and about 1991 cubic inches (32626 $cm^3$) for a sixty (60) inch (150 cm) length cartridge; which, in one embodiment, has a relatively smaller foot print than other comparable prior known high flow fluid filtration systems, such as a product available from Pall Corporation, East Hills, N.Y., under the tradename ULTIPLEAT or other conventional 2.5 inch (6 cm) diameter filter cartridges, while achieving approximately the same fluid flow rate through the filter housing; which, in one embodiment, provides a high flow filtration system having a relatively lower cost of filtration to a user when compared to similar filtration systems presently available in the market; which, in one embodiment, provides a high flow filtration system having a relatively higher media packing density (surface area per unit volume of the cartridge of about 0.10 to about 0.14 square feet per cubic inch (about 5.7 to about 7.9 square cm per cubic cm) when compared to competitive filtration system products, such as 3M model number 740B series filter cartridges or PALL ULTIPLEAT filter cartridges; which provides a high flow filtration system having a substantially uniform filter media pleat construction when compared to other known high flow fluid filtration systems, such as 3M model number 740B series filter cartridges; which, in one embodiment, provides a high flow filtration system having a relatively larger core inside diameter (including, but not limited to about 3 inches (8 cm) when compared to similar competitive filtration systems, such as 3M model number 740B series filter cartridges; which, in one embodiment, provides a single filter cartridge capable of processing a filtrate having a flow rate up to about three hundred and fifty (350) gpm (1325 lpm) to about five hundred (500) gpm (1893 lpm), depending upon the length of the filter cartridge and which provides a filtration system having a pleated filter media pack element wherein the filter media is pleated in a uniform, as defined above, cylindrical fashion and in at least one embodiment, has approximately eight (8) flaps that form around themselves, when viewed from the top of the filter cartridge form the shape of an octagon.

SUMMARY

In one aspect, the present disclosure provides a high flow filter cartridge that comprises a core element having an inner diameter, two ends and apertures formed in the core, a diamond patterned tubular pleated filter element having an inner and an outer diameter positioned about the core element wherein, in one embodiment, the ratio of the outer diameter to the inner diameter of the diamond patterned tubular pleated filter element is between about 1.5 to 2.5 (in some embodiments, between 1.8 to 2.4, or between 2.0 and 2.3), an open end cap, for transferring fluid into or out of the core element, positioned at one end of the core, and a closed end cap, for preventing fluid from exiting therefrom, positioned at the other end of the core, the closed end cap including structure for positioning the open end cap in a filtration housing.

As used in the context of the present disclosure, the term "diamond patterned tubular pleated filter element" refers to a filter element formed from a tube shaped filter media that is pleated in such a manner as to form folded diamond shaped pleats in the filter media. FIG. 6 illustrates an exemplary embodiment of a diamond patterned tubular pleated filter element with one of the folded diamond shaped pleats outlined by dotted line 40. As used in the context of the present disclosure, dotted line 40 represents the perimeter of a single pleat. The diamond shaped pleats may be rhombus or deltoid (i.e., kite) shaped. Due to the nature of the filter media materials and the inherent difficulties in folding a tubular material, the diamond shaped pleats may have additional wrinkles or variations that may alter the diamond shape, however, the diamond shape remains discernable.

The diamond patterned tubular pleated filter element shown in FIG. 6 is formed by reshaping a first perimeter of the circular tube into a first square shape as shown by dotted line 42, reshaping a second perimeter of the circular tube into a second square shape as shown by dotted line 44, and repeating this process (i.e., dotted lines 42, 44, 46). The first square shape and second square shape can be offset by 45 degrees relative to one another as shown in FIG. 6 to obtain a rhombus patterned tubular pleated filter element. Alternatively, the first square shape and second square shape can be offset at various angles relative to one another to obtain a deltoid patterned tubular pleated filter element.

The inner diameter of the diamond patterned tubular pleated filter element is defined by the diameter of a circle inscribed by the inner dimensions of the diamond patterned tubular pleated filter. The outer diameter of the diamond patterned tubular pleated filter element is defined by the diameter of a circle that circumscribes the outer dimensions of the diamond patterned tubular pleated filter. The inner and outer diameter of a diamond patterned tubular pleated filter element can vary depending on the number, shape, and dimension of the diamonds, as well as folding thickness of the filter media and the degree of compaction of the resulting filter. For example, FIG. 6 illustrates a diamond patterned tubular pleated filter element with low compaction in that the planes formed by lines 42, 44, and 46, are a relatively large distance from one another.

Considering the embodiment shown in FIG. 6 on a more theoretical basis, the lengths of the sides of each square shape (i.e., the center axis of the diamonds) are equal to the circumference of the tube divided by four. Thus, the inner diameter of the diamond patterned tubular pleated filter element is theoretically the circumference of the tube divided by four, the outer diameter of the diamond patterned tubular pleated filter element is theoretically the one-quarter the circumference of the tube multiplied by the square root of two, and the ratio of the outer diameter to inner diameter is 1.4 (assuming no material thickness and full compaction). Similar calculations for embodiments having triangular cross-sectional shapes (i.e., three diamond lengths per circumference) have a ratio of the outer diameter to inner diameter of 2.0. Calculations for embodiments having other polygonal cross-sectional shapes with 5, 6, 7, 8, 9, and 10 sides will have ideal ratios of 1.24, 1.15, 1.11, 1.08, 1.06, and 1.05, respectively. The actual ratios obtained, will typically be greater, at least in part, because the filter element thickness reduces the inner diameter and increases the outer diameter.

In another aspect, the present disclosure provides a high flow filtration system comprising: a housing structure having a fluid inlet, for housing at least one filter cartridge; a fluid outlet connected to the housing structure; at least one high flow filter cartridge having an outer surface with an outer diameter of, in one embodiment, about six and five tenths (6.5) inches (16.5 cm) and an inner core having a diameter of about 3.0 inches (8 cm), the at least one filter cartridge being positioned in the filter housing such that the flow of fluid is from the outer surface of the at least one filter cartridge to and out of the inner core of the at least one high flow filter cartridge, the inner core of the at least one high flow filter cartridge being in fluid communication with the fluid outlet of the housing structure; and a diamond patterned tubular pleated filter element having an outer diameter of about six and five tenths (6.5) inches (16.5 cm) positioned about the inner core of the at least one high flow filter cartridge such that, in one embodiment, a single high flow filter cartridge is capable of processing filtrate at a fluid flow rate of up to about 500 gpm.

In another aspect, the present disclosure provides a diamond patterned tubular pleated filter element comprising: a tube comprised of at least one layer of filter media having a plurality of pleats formed therein, wherein each pleat is formed in a plane which is offset by between about ten (10) degrees and about eighty (80) degrees from the plane in which an adjacent pleat lies.

Exemplary embodiments of the filter cartridges for use in high flow fluid filtration systems manufactured by the systems and methods of manufacturing filter cartridges of the present disclosure include filter cartridges that are capable of processing at a fluid flow rate of up to about three hundred and fifty (350) gpm (1325 lpm) in a forty (40) inch (102 cm) high flow filter cartridge and a fluid flow rate of up to about five hundred (500) gpm (1893 lpm) in a sixty (60) inch (152 cm) high flow long filter cartridge.

In one embodiment, the filter cartridges manufactured by the systems and methods of the present disclosure efficiently processes a relatively high liquid flow rate per filter cartridge, this embodiment comprises a diamond patterned tubular pleated filter element, which comprises a relatively larger amount of filter media area for a given filter cartridge volume.

Other features of exemplary embodiments of the systems and methods for manufacturing filter cartridges of the present disclosure include, but are not limited to, systems for producing a relatively greater media packing density (surface area per unit volume of cartridge) when compared to most other competitive products, systems and methods for producing a uniform filter media pleat geometry construction, systems for producing filter cartridges capable of enhanced efficient use of the interior space of a filter housing, while retaining a smaller filter housing diameter and systems for manufacturing filter cartridges and filter cartridges that need less filter housing space per volume of fluid processed.

Still other exemplary embodiments of the filter cartridges manufactured by the systems and methods of the present disclosure include, but are not limited to, filter cartridges design having a relatively larger core inside diameter of about, including, but not limited to, three (3) inches (8 cm) that, along with other features, enables a single filter cartridge that can process flow rates of up to about three hundred and fifty (350) gpm (1325 lpm) (40 inch (102 cm) cartridge length) to about five hundred (500) gpm (1893 lpm) (60 inch (152 cm) cartridge length).

Other features of exemplary embodiments of the high flow filtration system manufactured by the systems and methods of the present disclosure include, but are not limited to, the ability to provide a filter cartridge having a filter media element contained therein, the filter cartridge having a relatively high filter media surface area per unit volume. The surface area of the filter media contained in the filter cartridges can be controlled over a wide range simply by varying the packing of filter media, as will be explained in detail below. Additionally, the filter media nesting density can be controlled in a continuous or discontinuous manner over the length of the filter cartridge to produce filter cartridges having a uniform or gradient distribution of filter media distributed over the length of the filter cartridge. For example, the number of pleats per unit length can be varied along the unit length of the core.

Still another feature of some embodiments of the high flow filtration systems manufactured by the systems and methods of the present disclosure is that the high flow filtration system includes, but is not limited to, filter housings that have a relatively small footprint while achieving approximately the same fluid flow through the filter housing and is capable of containing a number or a size of filter cartridge that would previously have needed a relatively larger sized housing.

Another feature of certain embodiments of the high flow filtration systems manufactured by the systems and methods of the present disclosure is that the filtration costs associated with these systems are relatively lower per cartridge.

Still another feature of some embodiments of the high flow filtration system systems manufactured by the systems and methods of the present disclosure includes, but is not limited to, a locking mechanism that includes, but is not limited to, a complementary ramp feature on the filter cartridge and the plug base of the filter housings, which needs a low turning force for installation into and removal of the cartridge from the high flow filter housings.

Yet another feature of certain embodiments of the high flow filtration system manufactured by the systems and methods of the present disclosure is that the high flow filtration system reduces the number of used filter cartridges to dispose of, thus being relatively environmentally friendly.

Still another feature of some embodiments of the high flow filtration system manufactured by the systems and methods of the present disclosure is that the high flow filtration system needs relatively fewer filter cartridges in order to process the same fluid flow rate than many other similar filtration systems.

Yet another feature of certain embodiments of the high flow filtration system of the present disclosure is that the high flow filtration system manufactured by the systems and methods of the present disclosure has filtration costs that are relatively lower when compared to the filtration costs of many other similar filtration systems presently available in the market.

One feature of the present disclosure includes a filter cartridge manufactured by the systems and methods of the present disclosure comprising: an inner core having a diameter and having apertures formed therein; and a diamond patterned tubular pleated filter element having an inner and an outer diameter positioned about the inner core wherein, in one embodiment, the ratio of the outer diameter to the inner diameter of the diamond patterned tubular pleated filter element is between about 1.5 to about 2.5, in other embodiments the ratio is between about 1.8 to about 2.4, in yet further embodiments, the ratio is between 2.0 and 2.3

Still another feature of the present disclosure includes a filter cartridge manufactured by the systems and methods of the present disclosure wherein the outer diameter of the filtration cartridge includes, but is not limited to, about six and five tenths (6.5) inches (16.5 cm).

The above summary of the present disclosure is not intended to describe each disclosed embodiment or every implementation of the present disclosure. The Figures and the detailed description which follow more particularly exemplify illustrated embodiments.

BRIEF DESCRIPTION OF DRAWINGS

FIG. 2 is a perspective illustration of an exemplary filter cartridge useful in the high flow liquid filtration system of the present disclosure;

FIG. 3A is a plan view of the top end cap of the exemplary filter cartridge of FIG. 2;

FIG. 3B is a partial cross-section view of the exemplary filter cartridge of FIG. 2 illustrating the core and end cap components thereof;

FIG. 3C is a plan view of the bottom end cap of the exemplary filter cartridge of FIG. 2;

FIG. 3D is a partial cross sectional view of the top end cap component of the exemplary filter cartridge of FIG. 2;

FIG. 3E is a partial cross sectional view of the bottom end cap component of the exemplary filter cartridge of FIG. 2;

Figure 1:
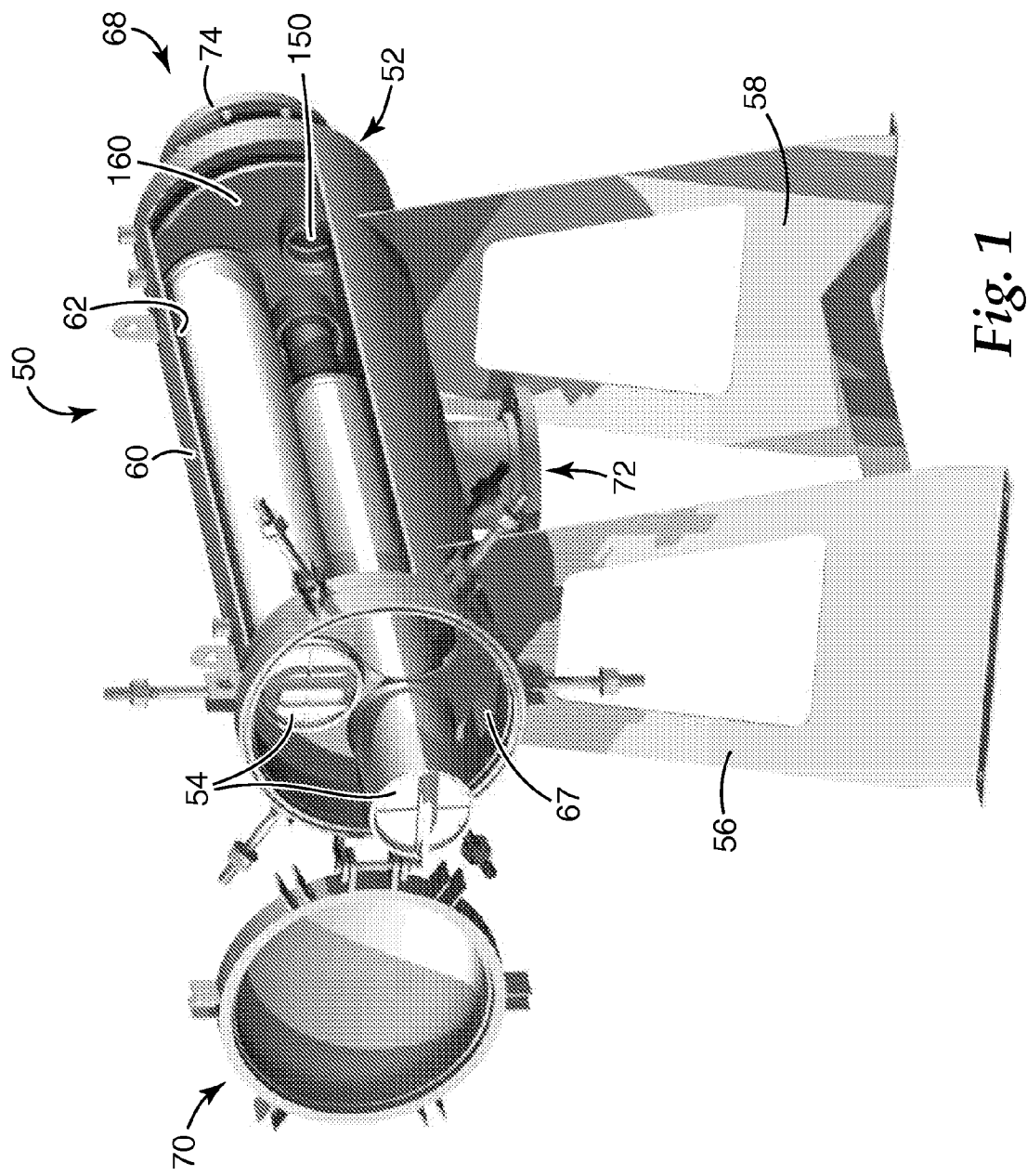
FIG. 1 is a perspective, schematic illustration, with a partial cutaway, of a exemplary high flow fluid filtration system of the present disclosure.
Figure 4A:
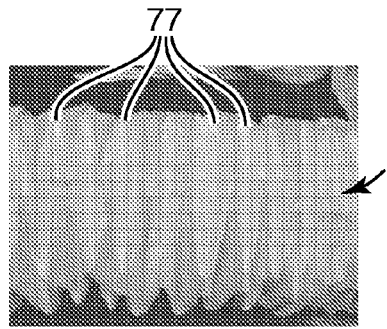
FIG. 4A is a digital image of in an exterior portion of a diamond patterned tubular pleated filter element of the present disclosure.
Figure 4B:
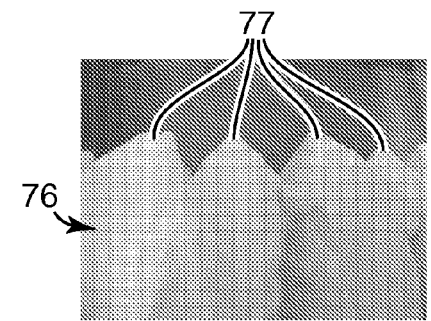
FIG. 4B is a digital image of an enlarged portion of the diamond patterned tubular pleated filter element of FIG. 4A.
Figure 4C:
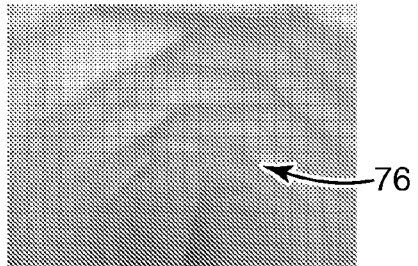
FIG. 4C is a digital image of an enlarged interior portion of a diamond patterned tubular pleated filter element of FIG. 4A.

While the above-identified drawing figures set forth several embodiments of the present disclosure, other embodiments are also contemplated. This disclosure presents the embodiments by way of representation and not limitation. It would be understood that numerous other modifications and embodiments could be devised by those skilled in the art which fall within the scope and spirit of the principles of this disclosure. The figures may not be drawn to scale. Like reference numerals have been used throughout the figures to denote like parts.

DETAILED DESCRIPTION

Unless indicated otherwise, in the present disclosure, the terms defined below have the following meanings:

As used herein, the term "high flow rate" refers to a relatively higher liquid flow through a filter cartridge, for example, flow rates of up to about 350 gpm (1325 lpm) in a 40 inch (102 cm) long filter cartridge and a fluid flow rate of up to about 500 gpm (1893 lpm) in a 60 inch (152 cm) long cartridge, or even higher, which creates a relatively higher flux flow.

As used herein, the term "flux" refers to the liquid flow per unit area of the filter media.

As used herein, the term "plug base" refers to a component in the filter housing which accepts the connector of a filter cartridge.

As used herein, the term "packing density" refers to the surface area of the filter media divided by the volume of the filter cartridge.

As used herein, the term "blown microfiber" refers to a nonwoven filter media made by blowing a small stream of molten material on a rotating collector roll, which results in a roll of filter media, also known as melt blown filter media.

As used herein, the term "TYPAR" refers to a spunbonded polypropylene web structure made of continuous filament polypropylene fibers that are randomly arranged, dispensed and bonded at the filament junctions (as a product available from Reemay, Inc, Charleston, S.C., under the tradename TYPAR.)

As used herein, the term "spunbond" refers to a nonwoven that is produced by a process in which a thermoplastic fiber forming polymer is extruded through a linear or circular spinneret. The extruded polymer streams are rapidly cooled and attenuated by air and/or mechanical drafting rollers to form desired diameter filaments. The filaments are then laid down onto a conveyor belt to form a web. The web is then bonded to form a spunbonded web. Spunbonding is in certain embodiments an integrated one step process which begins with a polymer resin and ends with a finished web.

The High Flow Filtration System

As illustrated in FIG. 1, the high flow filtration system 50 of the present disclosure comprises a high flow filter cartridge housing 52 and at least one high flow filter cartridge 54 positioned therein. As illustrated, this particular high flow filter cartridge housing 52 is depicted as a horizontal filter housing, it being understood that vertical filter housings could be similarly constructed, as would be understood by those skilled in the art. As would also be understood by those skilled in the art, a high flow filter cartridge or cartridges 54 are positioned internal of the filter housing body and may be secured therein by a plurality of possible structures known to those skilled in the art, such as, for example, plug bases.

Specifically, in exemplary embodiments, the high flow filtration system 50 of the present disclosure can be made available in a variety of sizes to accommodate from one to seven and possibly more high flow filter cartridges 54 in both of the present industry standard lengths, those being 40 inch (102 cm) and 60 inch (152 cm) lengths. The high flow filtration system 50 can be made available in either horizontal or vertical configurations, depending upon the specific operational needs. Generally, end users will choose the horizontal for ease of operation or the vertical option to reduce the-high flow filtration systems footprint thereby reducing capital investment expenses.

FIG. 1 illustrates one exemplary high flow filtration system 50 of the present disclosure in detail. As shown, the exemplary high flow filtration system 50 may comprise a high flow filter cartridge housing 52 supported by a pair of legs 56, 58 and having an outer surface 60 and an inner surface 62 adapted to receive at least one high flow filter cartridge 54 having a central core member 63 (see FIG. 3) with apertures 64 formed therein and an open end cap 65 and a closed end cap 66 (see FIGS. 2 and 3a-3c.) The high flow filter cartridge housing 52 has an open end 67 and a closed end 68, the open end being adapted to receive a closure member 70, the closure member 70 being capable of selectively, sealingly enclosing the open end 67 by means known to those skilled in the art. An inlet 72 may be positioned in filter cartridge housing 52 for receiving a fluid to be filtered from an external source (not shown) and a fluid outlet 74 positioned relative to the closed end 68 for receiving the filtered fluid from the high flow filter cartridge 54 central core member 63 (see FIG. 3a) and for transporting the filtered fluid to a remote location (not shown).

In order to convert the illustrated horizontal housing 52 into one embodiment of a vertical housing, after eliminating the supporting pair of legs 56, 58 and positioning similar supporting structure to the closed end 68, the housing would be rotated ninety degrees (90°) such the open end 67 would be above the closed end 68 which would be positioned below the open end 67 and proximate the floor.

Filter Media

As shown in FIGS. 4A-6, one filter media found to be useful in the diamond patterned tubular pleated filter element 76 installed in the high flow filter cartridge 54 of the exemplary system is a nonwoven material, and in another embodiment, a nonwoven blown microfiber (or melt blown) web, as is know to those skilled in the art. (See U.S. Pat. Nos. 4,842, 739 and 5,336,405, the disclosure of each is herein incorporated by reference to the extent not inconsistent with the present disclosure.)

One exemplary filter media that may be utilized in the manufacture of the diamond patterned tubular pleated filter element 76 installed in the high flow filter cartridges 54 comprises, but is not limited to, a blown microfiber that is made to tightly controlled fiber diameter specifications to produce absolute rated retention efficiencies or other filter media capable of performing the filtration function needed in a specific application. One example of such blown microfiber media is manufactured by 3M Company, St. Paul, Minn., and commercially available in current filter cartridge model 740. Specifically, the filter media useful as the diamond patterned tubular pleated filter element 76 installed in the high flow filter cartridge 54 may be manufactured from meltblown FDA compliant polypropylene microfiber media, providing high particle removal efficiency with broad chemical compatibility. In certain embodiments no adhesives, binders or silicone are used in the manufacturing process. All support layers and/or associated hardware (if utilized) are constructed with polypropylene or other material capable of performing the needed function in a specific application, as would be understood by those skilled in the art.

Diamond Patterned Tubular Pleating Systems and Methods

In accordance with one exemplary embodiment of the present disclosure, a series of nonwoven filter media webs, including, but not limited to, an upstream relatively open prefilter layer, such as TYPAR, a relatively finer particle filtration media and a downstream support layer, are seamed together into a filter tube stock by at least one fluid impervious seam to produce a flat tube shaped seamed filter media which is then embossed through the application of heat and pressure, as described in U.S. Pat. No. 4,842,739 (Tang).

During the pleating of the diamond patterned tubular pleated filter element, the tube shaped laminated and seamed filter media is opened, folded and longitudinally collapsed to form a generally cylindrical filter element comprised of stacked disk shape layers, as illustrated in FIGS. 4A-6. The resulting tube shaped laminated and seamed filter media 78 has been found to have relatively consistent particle retention when converted into a compact, space saving diamond patterned tubular pleated filter element for utilization in exemplary filter cartridges.

The filter tube stock is converted, then pleated on a mandrel to form the diamond patterned tubular pleated filter element 76 used in the manufacture of the high flow filter cartridge 54 of the present disclosure, as will be described in more detail below. Among other features, the resulting diamond patterned tubular pleated filter element 76 in certain embodiments exhibits relatively higher media utilization than many conventionally pleated media filters.

FIGS. 4A-6 illustrate an exemplary diamond patterned tubular pleated filter element 76, manufactured as described above, with the filter media pleated direction being from inside (core) out toward the outer diameter and the filter media pleats are in a substantially horizontal plane when the finished high flow filter cartridge 54 is standing up on one end or when the filter media pleated surface is positioned about 90° to the longitudinal axis of the high flow filter cartridge 54.

Figure 7:
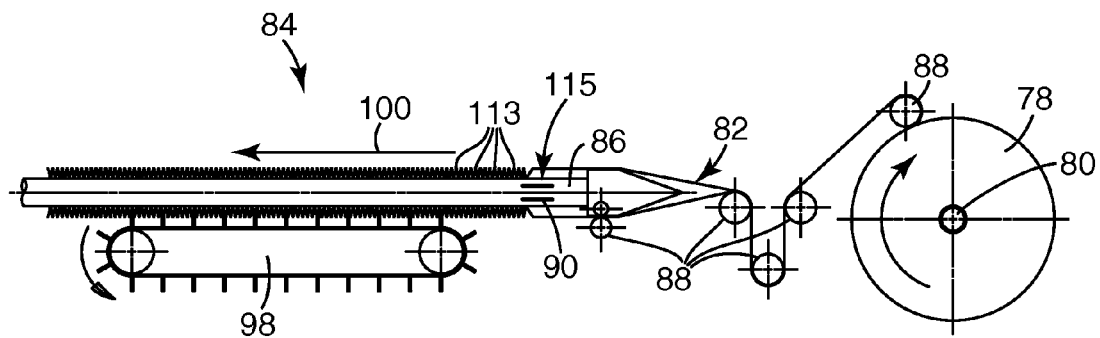
FIG. 7 is a schematic illustration of a exemplary pleating system of the present disclosure.

As schematically illustrated in FIG. 7, in one embodiment, the previously assembled tube shaped laminated and seamed filter media 78 is positioned on a media unwind mechanism 80 such that the tube shaped laminated and seamed filter media 78 is unwound and fed into the cone-shaped starting point 82 which is connected to a tube which serves as a mandrel 86 over which the tube shaped laminated and seamed filter media 78 is pleated by the illustrated exemplary pleating process 84. Once the tube shaped laminated and seamed filter media 78 is loaded into the cone-shaped starting point 82 of the mandrel 86, the tube shaped laminated and seamed filter media 78 expands from its flattened state into a cylindrical shape as the filter media 78 passes over the cone shaped starting point 82 of mandrel 86.

Drive rollers 88 serve the dual purpose of supporting the cone-shaped starting point 82 of mandrel 86 and driving the tube shaped laminated and seamed filter media 78 onto the cone-shaped starting point 82 of mandrel 86.

During the pleating process, the tube shaped laminated and seamed filter media 78 is pressurized with air from air slots 90 positioned in the mandrel 86 that allows air to escape the mandrel 86 into the tube shaped laminated and seamed filter media 78 at an area 101 (see FIG. 8) just prior to where the filter media pleating operation is accomplished. During this pressurization process, the pressurized air inflates the tube shaped laminated and seamed filter media 78 in order to ensure that the tube shaped laminated and seamed filter media 78 maintains a cylindrical shape with enough structural integrity to resist collapse during the pleating process.

As illustrated in FIGS. 7-10, an exemplary pleater mechanism 92, according to the present disclosure includes, two sets of blade mechanisms 94, 96 (see FIG. 8) with four (4) blades 106, 108, 110, 112 in each set (see FIG. 9) that are used to perform pleating operations on the tube shaped laminated and seamed filter media 78. The blade mechanisms 94, 96, in one embodiment, alternately engage the tube shaped laminated and seamed filter media 78; compress the tube shaped laminated and seamed filter media 78 radially toward the mandrel 86 and push the newly pleated filter media 113 downstream where a lugged conveyor 98 engages the now pleated tube shaped laminated and seamed filter media 100 downstream of the filter media pleater mechanism 92. The speed of the lugged conveyor 98 is set such that a back-pressure is established for pleat forming, which influences the uniformity, meaning that each pleat look similar to the other pleats of the now pleated tube shaped laminated and seamed filter media 100, during the pleating process. Running the lugged conveyor 98 at a reduced speed from the unwind mechanism, has been found to result in greater backpressure in the pleat forming area 115. Increased backpressure results in more sharply folded pleats with less distance between individual pleats.

Figure 8:
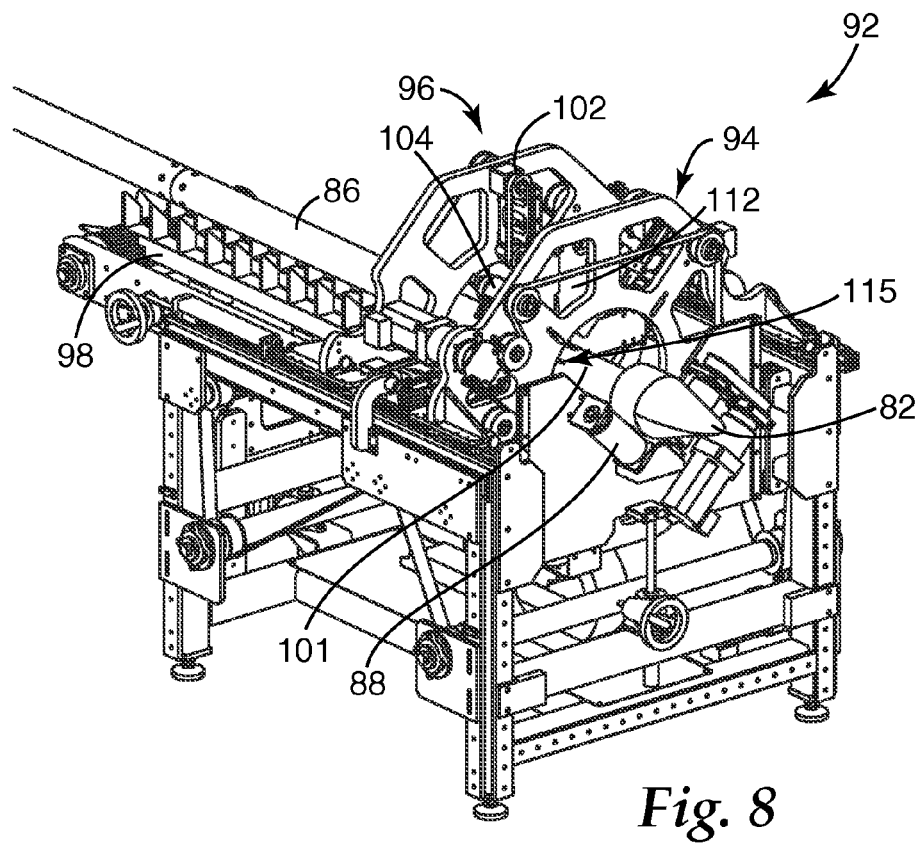
FIG. 8 is a partial perspective illustration of the exemplary pleating system of FIG. 7.

FIG. 8 illustrates one exemplary pleater mechanism 92 that supports and drives one of the blade mechanisms 94, 96 of the at least two pleating blade mechanisms each comprising a plurality of pleating blades 106, 108, 110, 112. As illustrated, the pleating blades 106, 108, 110, 112 are oriented at about ninety (90) degree intervals. All four (4) pleating blades 106, 108, 110, 112 are mechanically coupled to pleating blade mechanisms 102, 104 to allow them to move simultaneously in a radial direction 114 such that, the four pleating blades 106, 108, 110, 112 all move toward the center or away from the center of the blade mechanisms 94, 96 substantially simultaneously. As shown, the exemplary pleater mechanism 92 also comprises a plate 116 for mounting the pleating blade mechanisms 102, 104 thereto, the plate 116 capable of moving in an axial direction 118. This configuration assures that the pleating blades 106, 108, 110, 112 also move substantially simultaneously in an axial direction 118.

In other embodiments, the pleating blades may be more or less than the illustrated four blades and may be positioned at different angles relative to the axial direction 118 of the pleater. In certain embodiments this angle may be between about twenty (20) and about one hundred twenty (120) degrees.

Figure 9:
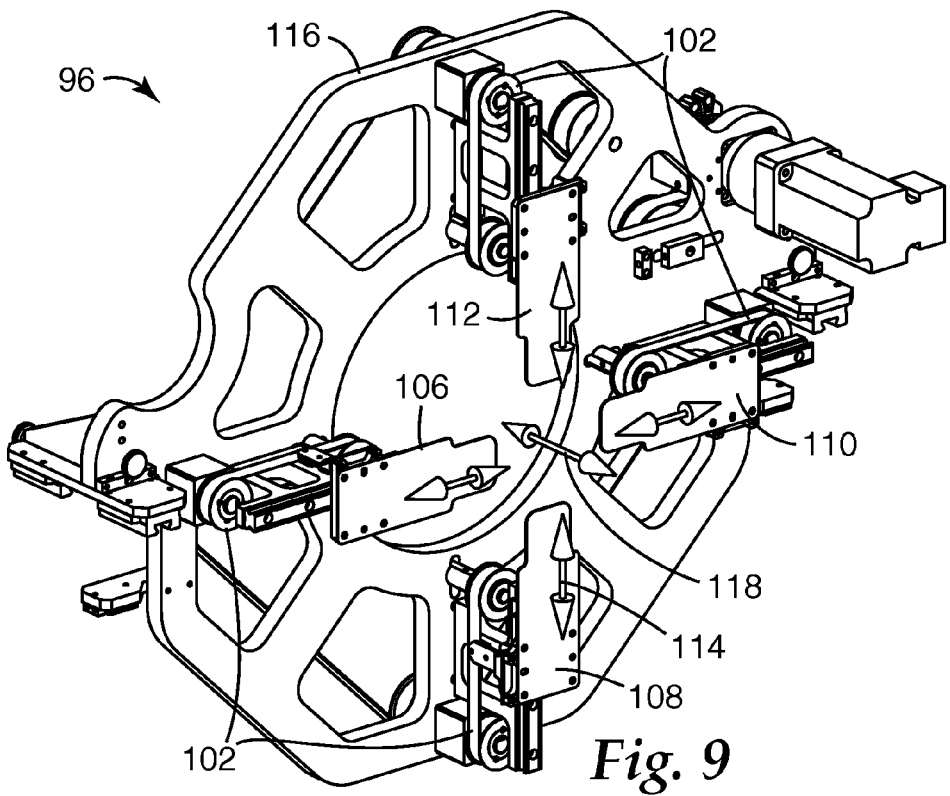
FIG. 9 is a perspective, partial cutaway view of one of the two exemplary blade mechanisms of the exemplary pleating system of FIG. 8.

As illustrated in FIGS. 8 and 9, the pleating blade mechanisms 102, 104 are driven in a repeating cycle, with both the radial 114 and axial 118 motions occurring simultaneously in order to create the blade motion described above. Each repeating cycle results in the tube shaped laminated and seamed filter media 78 being compressed and folded from its original cylindrical shape to newly formed filter media pleats 113, for example, four (4) folds, each pleat formed by the 4 blades contacting the tube in 4 different places, one fold performed by each of the blades moving radially toward the center of the cylinder. The axial blade motion 118 compresses the filter media and moves it downstream away from the pleater mechanism 92. The presence of backpressure against the downstream movement of the newly formed filter media pleats 113 is quite useful because if no resistance were provided to limit the downstream movement of the newly formed filter media pleats 113, the pleated filter media would not be constrained from returning to its original tube shape immediately after passing through the pleater mechanism. The newly formed filter media pleats 113 are held back by the lugged conveyor 98, creating the backpressure that forms a stack of the newly formed filter media pleats. The degree to which the filter media material is creased to produce the newly formed filter media pleats 113 is a function of the backpressure applied by the resistance of the movement of the structure (not shown) connected to the lugged conveyor 98 as the lugged conveyor is moved downstream from the pleating mechanism 92. After each filter media pleat is formed, the pleating blades 106, 108, 110, 112 move up and out of the filter media and return to the filter media pleating process starting point to initiate the pleating process again.

The second pleating blade mechanism 104 is identical to the first pleating blade mechanism 102 except that the second pleating blade mechanism 104 is oriented at about forty five (45) degrees from the first pleating blade mechanism 102 (measured around the longitudinal axis of the tube shaped laminated and seamed filter media 78). In other embodiments, the second pleating blade mechanism may be oriented at angles of about ten (10) degrees to about eighty (80) degrees from the first pleating blade mechanism.

Figure 10:
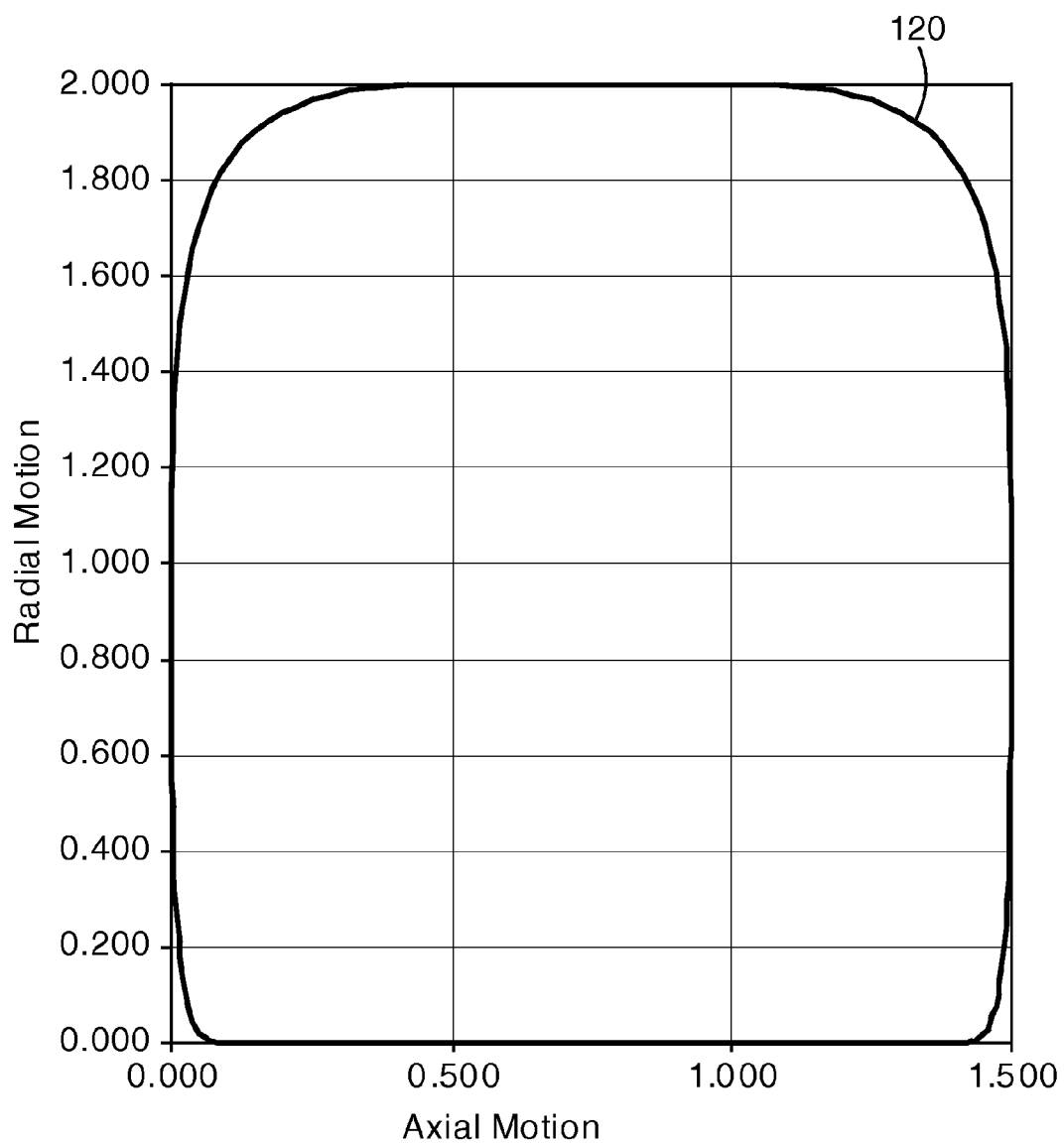
FIG. 10 is a graphic representation of a exemplary blade motion profile of the exemplary blade mechanism of FIG. 9.

During the pleating process, each pleating blade mechanism 102, 104 is cycled through substantially the same blade motion profile 120, illustrated in FIG. 10. FIG. 10 is a plot of the motion traced by the tip of a blade 106; the horizontal axis represents the distance moved parallel to the mandrel 86; the vertical axis represents the distance moved radially (toward or away from the mandrel 86), except that the cycles are about one hundred eighty (180) degrees out of phase with each other as the first pleating blade mechanism 102 is forming a filter media pleat, the second pleating blade mechanism 104 is retracting and moving back to the start position, and vice-versa.

In certain embodiments, it has been determined that at least one set of the pleating blades 106, 108, 110, 112 would be in contact with the tube shaped laminated and seamed filter media 78 at any one time so that the pleated tube shaped laminated and seamed filter media 100 are not able to spring back in the upstream direction toward the infeed during the pleat forming process (see FIG. 7). In such embodiments, both pleating blade mechanisms 102, 104 operate over substantially the same range of movement with each starting point being substantially the same relative to the tube shaped laminated and seamed filter media 78.

Because the two pleating blade mechanisms 102, 104 are offset by, as illustrated, about forty five (45) degrees, each filter media pleat 77 (see FIG. 6) is oriented at about forty five (45) degrees from the filter media pleat formed before and the filter media pleat formed after the filter media pleat being formed in real time.

After a predetermined amount of the tube shaped laminated and seamed filter media 78 is pleated to form one diamond patterned tubular pleated filter element 76, such predetermined amount of newly formed filter media pleats 113 is severed from the seamed filter media on the mandrel 86 downstream from the pleating blade mechanisms 102, 104 in order to make a single separate diamond patterned tubular pleated filter element 76. After being severed, the single separate diamond patterned tubular pleated filter element 76 is propelled along the mandrel 86 away from the pleater mechanism 92 toward a cartridge assembly station 124 (FIGS. 11 and 12).

Figure 11:
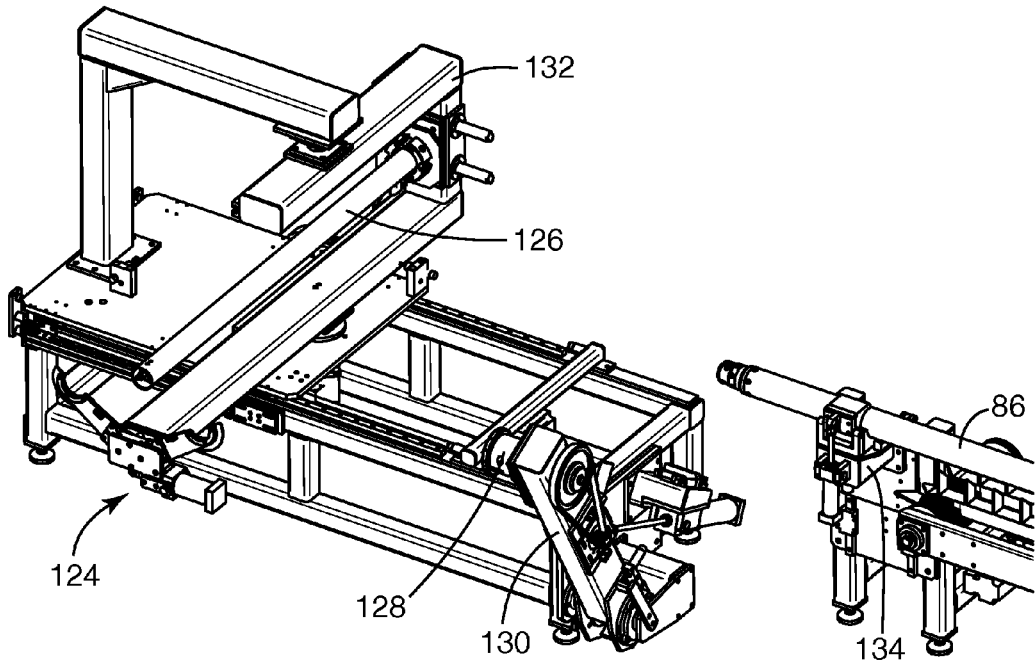
FIG. 11 is a perspective illustration of an exemplary assembly module of present disclosure in the load position.

An exemplary cartridge assembly station 124, of the present disclosure, is illustrated in FIG. 11 in the ready to be loaded position. In order to prepare the cartridge assembly station 124 for the transfer of the newly formed pleated filter media 113 from the mandrel 86 to the cartridge assembly station 124 (see FIG. 7), an operator may position a central core member 63 having apertures 64 formed therein (see FIG. 3A) with the open end-cap 65 connected at one end over a spindle 126 and/or position the closed end cap 66 in a spin-weld chuck 128 which is positioned on a spin weld arm 130.

Once the above conditions have been met, the cartridge assembly station 124 automatically traverses to a position where a spindle support 132 is rotated about 90 degrees and translated to bring the spindle 126 into alignment with the mandrel 86. Next, the spindle 126 and the mandrel 86 are mechanically coupled with the mandrel support 134 being disengaged such that the mandrel 86 is supported by the spindle 126.

Figure 12:
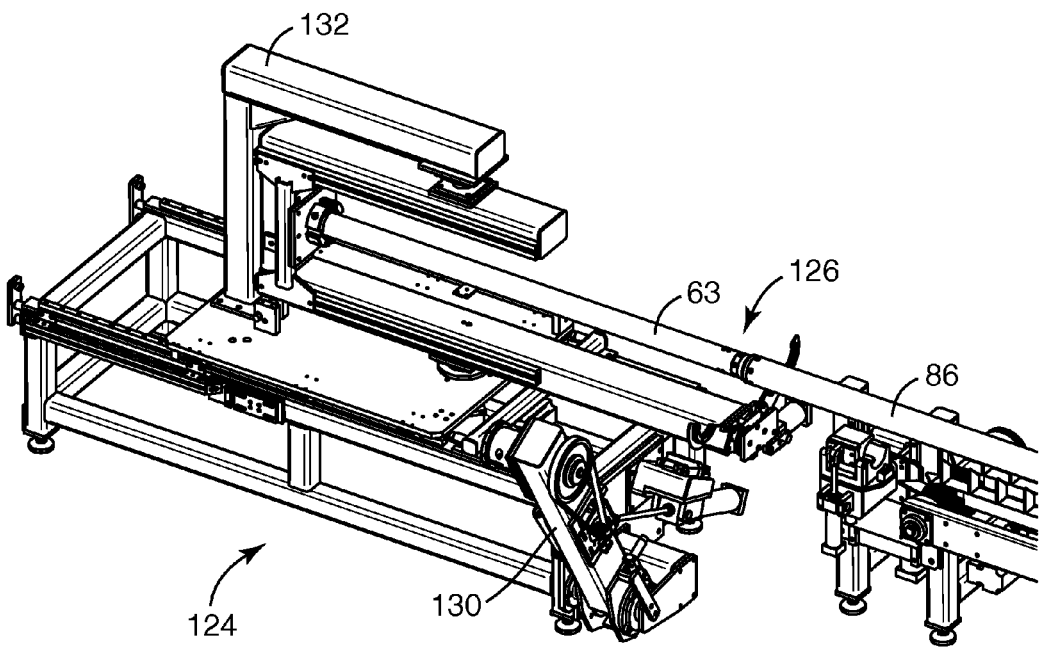
FIG. 12 is a perspective illustration of the exemplary assembly module of FIG. 11 in the ready for pleat pack position.

As illustrated in FIG. 12, the newly formed pleated filter media 113 (see FIG. 7) are traversed along the mandrel 86 and over the central core member 63, as depicted in FIG. 3B, which would have been previously loaded onto the spindle 126. After the newly formed filter media pleats 113 are positioned onto the central core member 63, the cartridge assembly station 124 moves to the position illustrated in FIG. 13.

Figure 13:
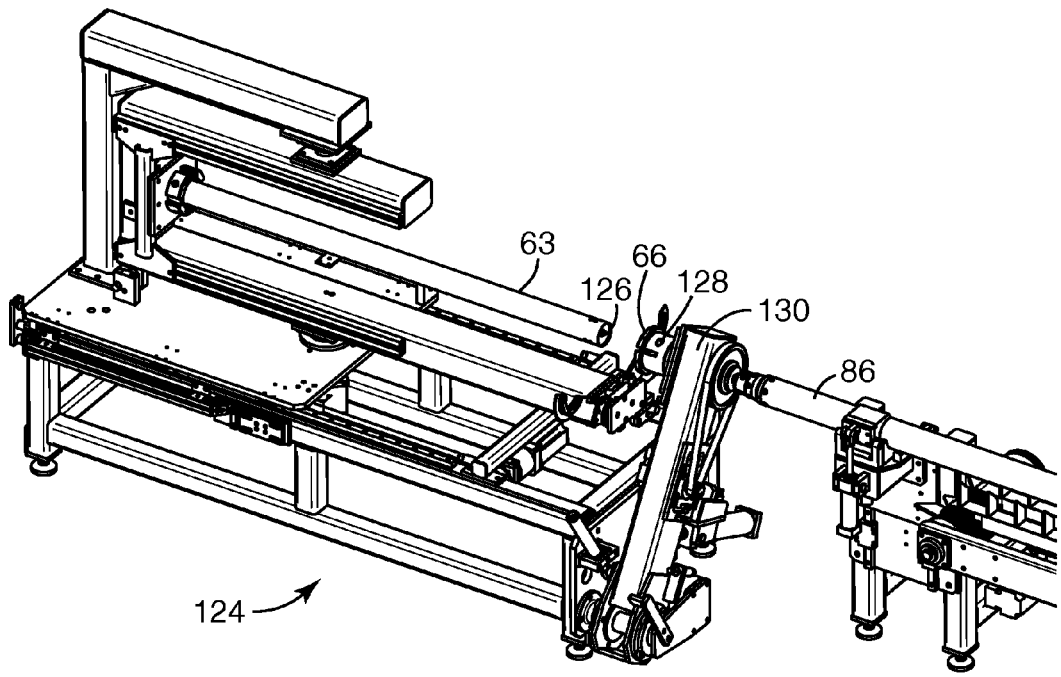
FIG. 13 is a perspective illustration of the exemplary assembly module of FIG. 11 in the ready for spin welding position.

As illustrated in FIG. 13, the spindle 126 is decoupled and moved away from the mandrel 86 and the spin-weld arm 130 is moved into alignment with the spindle 126. The operative connection of the closed end cap 66, such as, for example, by spin-welding is accomplished by rotating the spin-weld chuck 128 positioned in the spin weld arm 130 as the spindle 126 traverses to bring the central core member 63 into contact with the closed end-cap 66.

After unloading the finished high flow filter cartridge 54, the cartridge assembly station 124 returns to the position illustrated in FIG. 11. In this position, the cartridge assembly station 126 is in condition for the loading a new closed end cap 66 in the spin weld chuck 128 and a new central core member 63 onto the spindle 126 in preparation for the next filter cartridge assembly cycle.

Figure 5A:
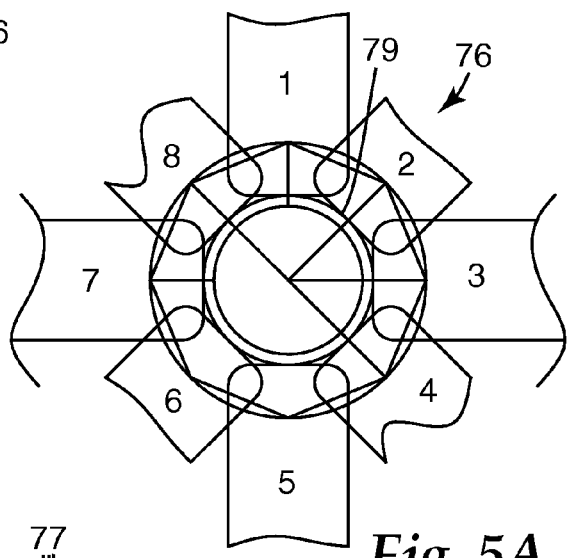
FIG. 5A it is a plan view of a two (2) synchro set of the pleats of a diamond patterned tubular pleated filter element of the present disclosure.
Figure 5B:
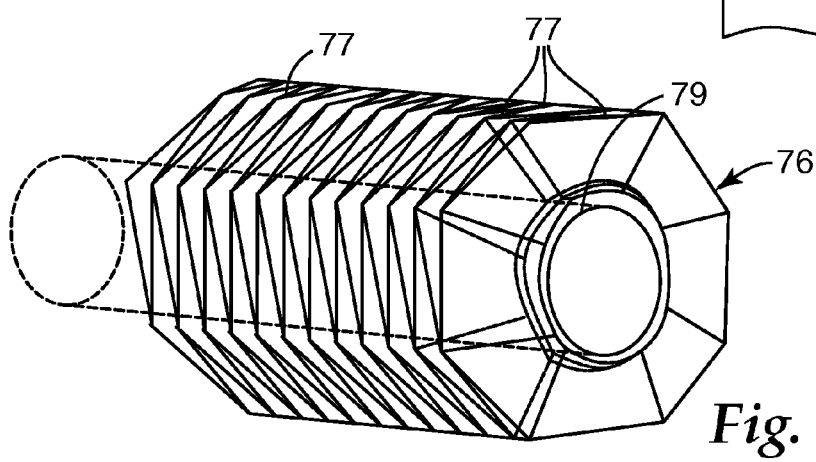
FIG. 5B is a perspective view of a diamond patterned tubular pleated filter element of the present disclosure.

As illustrated schematically in FIG. 5B, as the outer diameter (OD) of the central core member 63 (not shown) or the inner diameter (ID) of the high flow filter cartridge 54 (these diameters are essentially the same) is increased, the distance between any two filter media pleats of the diamond patterned tubular pleated filter element 76, measured along the intervening or connecting media, placed within the high flow filter cartridge 54 on the central core member 63 decreases. The number of individual pleats per unit length can be varied depending on the geometry of pleats and the compaction of the media along the cartridges longitudinal axis.

Figure 6:
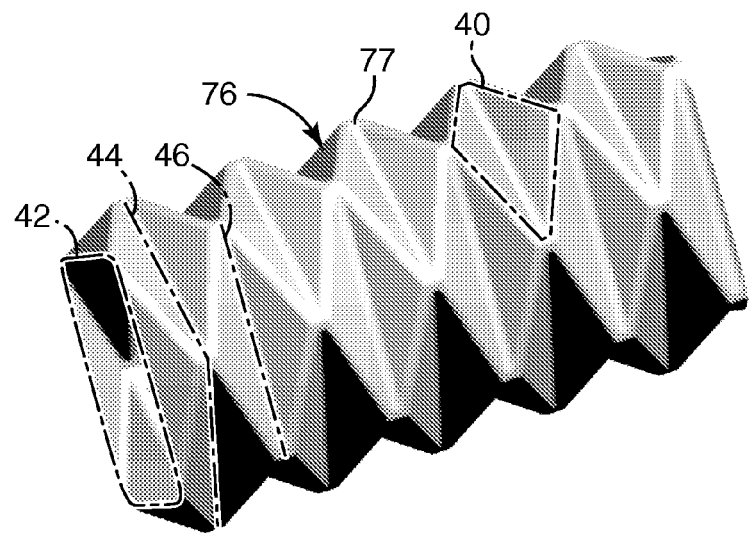
FIG. 6 is a schematic isometric illustration of a partial diamond patterned tubular pleated filter element of the present disclosure.

As best illustrated in FIGS. 5A-6, one possible embodiment of the diamond patterned tubular pleated filter element 76, manufactured in accordance with the present disclosure, comprises a plurality of single separate radially pleated filter media pleats 77 having a front face equal to about 3.6 in$^2$ (23 cm$^2$) or about 0.025 ft$^2$ (0.0023 m$^2$) when the central core member 63 inner diameter for receiving the diamond patterned tubular pleated filter element 76 is about three (3) inches (8 cm).

As described above, and illustrated in FIGS. 4A-5B at least one embodiment of the diamond patterned tubular pleated filter media design pattern comprises an alternating pattern with pleat forming occurring in two different planes, phased or offset from each other by, in the illustrated embodiment, about forty-five (45) degree increments. Typically, the diamond patterned tubular pleated filter element 76 density is increased because the illustrated forty-five (45) degree phase used during pleating of the radial filter media pleats, allows the radially pleated filter media to stack relatively tightly on top of each other, as illustrated in FIGS. 5A-5B. In certain embodiments the diamond patterned tubular pleated media pack element comprises from about 250 to 400 pleats, in certain embodiments between about 300 and 350 pleats.

The diamond patterned tubular pleated filter element 76 of the present disclosure includes an inner and an outer diameter. The inner diameter of the diamond patterned tubular pleated filter element 76 is adapted to be positioned over the outer diameter of the center core member 63. In some embodiments, the inner diameter of the diamond patterned tubular pleated filter element 76 is from about two and one half inches (2.5) to about three and three quarters inches (3.75) when the outer diameter of the diamond patterned tubular pleated filter element 76 is about six and five tenths inches (6.5). The ratio of the outer diameter to the inner diameter of the diamond patterned tubular pleated filter element is about 1.5 to about 2.5 when the outer diameter is about six and five tenths inches (6.5). In one specific embodiment, the inner diameter of the diamond patterned tubular pleated filter element 76 is about three inches (3.0).

Filter Cartridge Construction

As generally discussed above and best illustrated in FIGS. 2, 6 and 7, the exemplary high flow filter cartridge 54 of the present disclosure has a generally cylindrical shape and comprises a central core member 63 element having a nested arrangement of disk shaped in various shapes, including the illustrated (FIG. 5B) octagonal shaped disks made of the radially pleated filter media pleats 77 arranged in a horizontal pleated pattern when the high flow filter cartridge 54 is in the vertical position and a closed end cap 66 and an open end cap 65 are installed thereon.

As illustrated in FIG. 3A, the central core member 63 is manufactured, in at least one embodiment, of extruded polypropylene and includes apertures 64 to provide a liquid flow path for fluid flow either from outside in or inside out of the central core member 63. As illustrated in FIG. 3B, the central core member 63 also comprises unperforated circumferential ribs 136, 138 positioned at both ends of the central core member 63 and in one embodiment are, about one quarter (0.25) inches (1 cm) wide in order to provide for an optimally strong operative connection by, including but not limited to, a spin welded joint or any other connecting method that is capable of providing acceptable performance in the intended environment of use.

In one specific exemplary embodiment, one end of the central core member 63 is spin welded to a closed end cap 66 having structure 140, such as, for example a handle, and the other end is spin welded to an open end cap 65 having an o-ring 142. It has been determined in the assembly process that the use of a spin welding process, a well known assembly technique for joining the type parts described above, provides a sufficiently strong bond between the central core member 63 and both of the cartridge end caps 65, 66 to enable the high flow filter cartridge to be capable of providing acceptable performance in the intended environment of use.

As mentioned above, the exemplary high flow filter cartridges 54 comprise a central core member 63 member having apertures 64, a diamond patterned tubular pleated filter element 76, position over the central core member 63 member, an open end cap 65 having a fluid outlet 74 positioned at one end of the central core member 63 for allowing filter fluid to exit the high flow filter cartridge 54, a closed end cap 66 including the handle 140, for connecting the high flow filter cartridge 54 to a high flow filter cartridge housing 52 and for removing the high flow filter cartridge 54 from the high flow filter cartridge housing 52, via use of the structure 140.

In certain embodiments, a single diamond patterned tubular pleated filter element 76 utilized in the high flow filter cartridge 54 of the present disclosure has been determined to provide more media surface area in a given volume and/or higher loading capacity for longer service life and/or lower cost filtration than certain other types of similar conventional filter cartridges.

One feature of the high flow filter cartridge 54 of the high flow filtration system 50 of the present disclosure is the size of the inner diameter of the central core member 63. For example, it has been found that by increasing the inner diameter of the central core member 63 up to and including, but not limited to, about three (3) inches (8 cm) and somewhat larger, the flow rate through the high flow filter cartridge 54 and subsequently the high flow filter system 50 of the present disclosure is increased. Specifically, a single high flow filter cartridge 54 having a central core member 63 diameter of about three (3) inches (8 cm), according to the present disclosure, has been found to be capable of processing a fluid flow rate of up to about 350 gpm (1325 lpm) in a 40 inch (102 cm) long filter cartridge and a fluid flow rate of up to about 500 gpm (1893 lpm) in a 60 inch (152 cm) long cartridge.

Specifically, it has been determined that the higher usable filtering surface area in a given space of the filter media of the present disclosure results in a fluid flow capability of up to about 500 gpm (1893 lpm) per filter cartridge, which has been determined to reduce the number of filters used. More specifically, when filtering the same amount of contaminate from a fluid, a smaller number of replaceable filter cartridges manufactured in accordance with the systems of the present disclosure are used than used by at least several prior art filter cartridges, thereby minimizing product loss, because each used cartridge retains a certain amount of filtered fluid when disposed of, and/or labor cost, and/or disposal costs, and/or operator exposure to contaminate, and/or downtime for filter change out.

High Flow Filter Housing Construction

As best illustrated in FIG. 1, the high flow filter housings 52 according to the present disclosure are specifically designed to deliver efficient high flow filtration systems in a compact footprint, as mentioned above. Housings may be manufactured in standard designs, as well as customizable configurations to suit specific needs and in a variety of sizes to accommodate from, but not limited to, one (1) to seven (7) filter cartridges or as many high flow filter cartridges 54 as practicable, for example, in both 40-inch (102 cm) and 60-inch (152 cm) lengths. High flow filter cartridge housings 52 of the present disclosure may also be manufactured in horizontal or vertical configurations, as mentioned above.

Figure 15A:
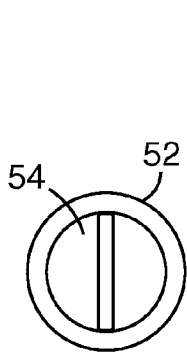
FIG. 15A is a schematic cross-sectional view illustrating an exemplary cartridge housing encasing the single filter cartridge that allows the filtration system to operate at about 350 gpm (1325 lpm) according to the present disclosure.
Figure 15B:
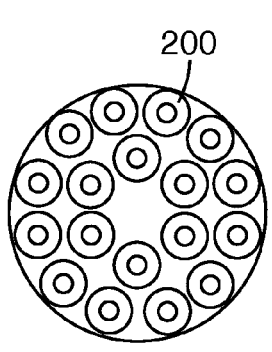
FIG. 15B is a schematic cross-sectional view illustrating a competitive cartridge housing encasing 18 filter cartridges needed to operate the competitive filtration system at about 350 gpm (1325 lpm)
Figure 15C:
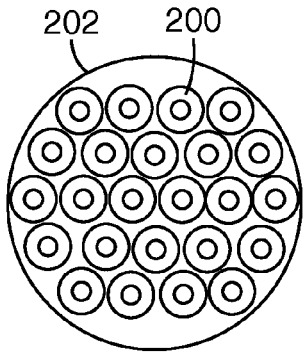
FIG. 15C is a schematic cross-sectional view illustrating another competitive cartridge housing encasing 24 filter cartridges needed to operate the competitive filtration system at about 350 gpm (1325 lpm)

For example, as illustrated in FIGS. 15B and 15C, up to about twenty four (24) thirty (30 inch) (76 cm) high conventional 2.5 (7 cm) inch diameter pleated filter cartridges 200 or more may be needed to filter a fluid at a flow rate of about 350 gpm (1325 lpm) and would need up to a sixteen (16) inch (41 cm) diameter filter housing 202 or larger to enclose the needed filter cartridges 200.

In contrast, as illustrated in FIG. 15A, only one of the high flow cartridges 54 of the present disclosure would be needed to filter the same fluid at the same flow rate and would need an about 8.6 inch (22 cm) diameter housing, nearly about half the diameter of the prior art cartridge housing. A smaller outer diameter leads directly to cost savings in the manufacture of the filter housings. Specifically, such reduction in the outer diameter would directly result in the need for less metal to fabricate the smaller diameter cartridge housing utilizing the angled deflector plate of the present disclosure in contrast to the larger outer diameter cartridge housing utilizing the flat baffle. Such cartridge filter housing having a smaller outer diameter would naturally result in reduced footprints on the factory floor, thereby reducing the factory floor space needed to accommodate the same number of filter cartridges and, thus, freeing some factory floor space to be utilized for other equipment or operations.

Figure 16A:
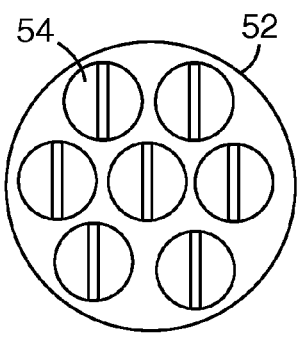
FIG. 16A is a schematic cross-sectional view illustrating an exemplary cartridge housing encasing seven filter cartridges that allows the filtration system to operate at about 2000 gpm (7571 lpm) according to the present disclosure.
Figure 16B:
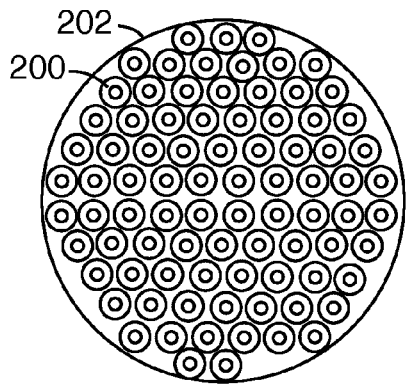
FIG. 16B is a schematic cross-sectional view illustrating a competitive cartridge housing encasing 85 filter cartridges needed to operate one competitive filtration system to operate the competitive system at about 2000 gpm (7571 lpm)
Figure 16C:
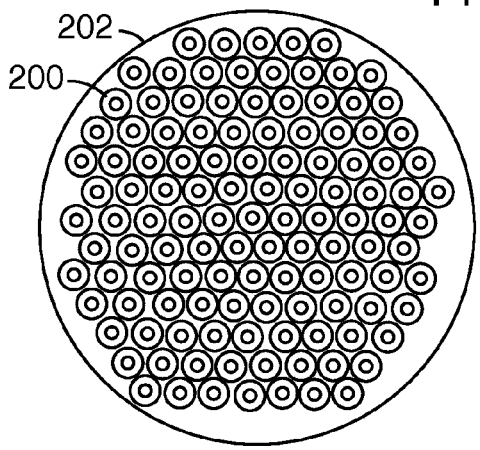
FIG. 16C is a schematic cross-sectional view illustrating a cartridge housing encasing 120 filter cartridges needed to operate another competitive filtration system at about 2000 gpm (7571 lpm)

In another example, as illustrated in FIGS. 16B-16C, up to about one hundred twenty (120) thirty (30 inch) (76 cm) high conventional 2.5 (7 cm) inch diameter pleated filter cartridges 200 or more may be needed to filter a fluid at a flow rate of about 2000 gpm (7571 lpm) and would need up to a thirty six (36) inch diameter filter housing 202 or larger to enclose the needed competitive filter cartridges 200.

In contrast, as illustrated in FIG. 16A, only seven of the high flow cartridges of the present disclosure would be needed to filter the same fluid at the same flow rate and would need an about 24 inch diameter housing, nearly about half the diameter of the competitive cartridge housing.

The foregoing illustrates the benefits of the exemplary high flow filter cartridge 54 and high flow filter cartridge housing 52 arrangements of the present disclosure when compared to certain comparative filter cartridge and filter housing arrangements of the prior art.

Specifically, the high flow system of the present disclosure would utilize up to about ninety percent (90%) fewer cartridges for filtration at a given flow rate and the high flow housing would are between about thirty three percent (33%) to about fifty percent (50%) smaller than the illustrated competitively sized filter housings.

Figure 17A:
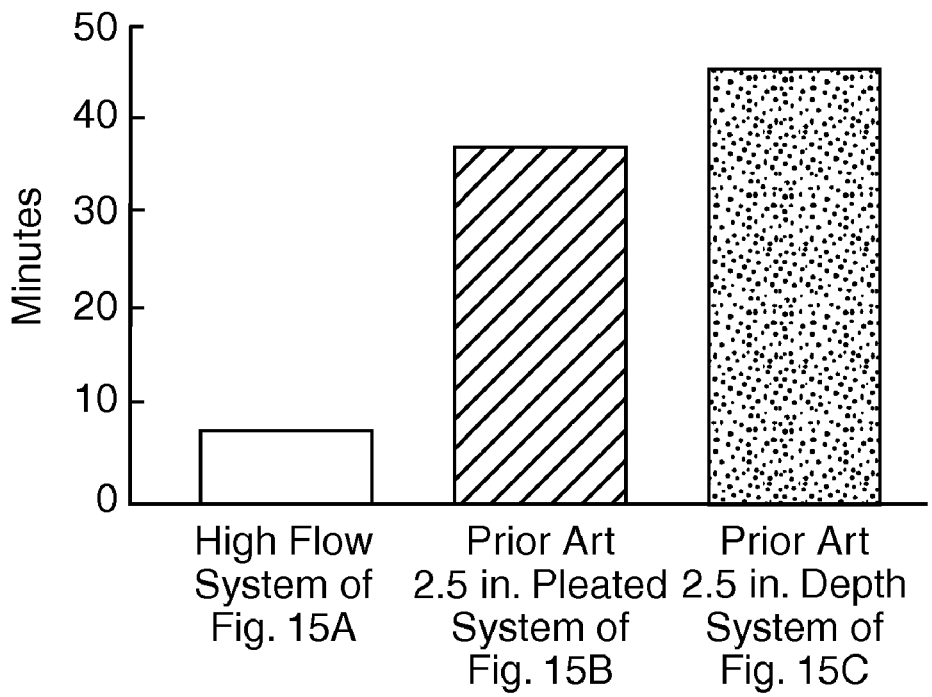
FIG. 17A is a graph illustrating the typical time/labor for filter cartridges of FIGS. 15A-15C operating at about 350 gpm (1325 lpm)
Figure 17B:
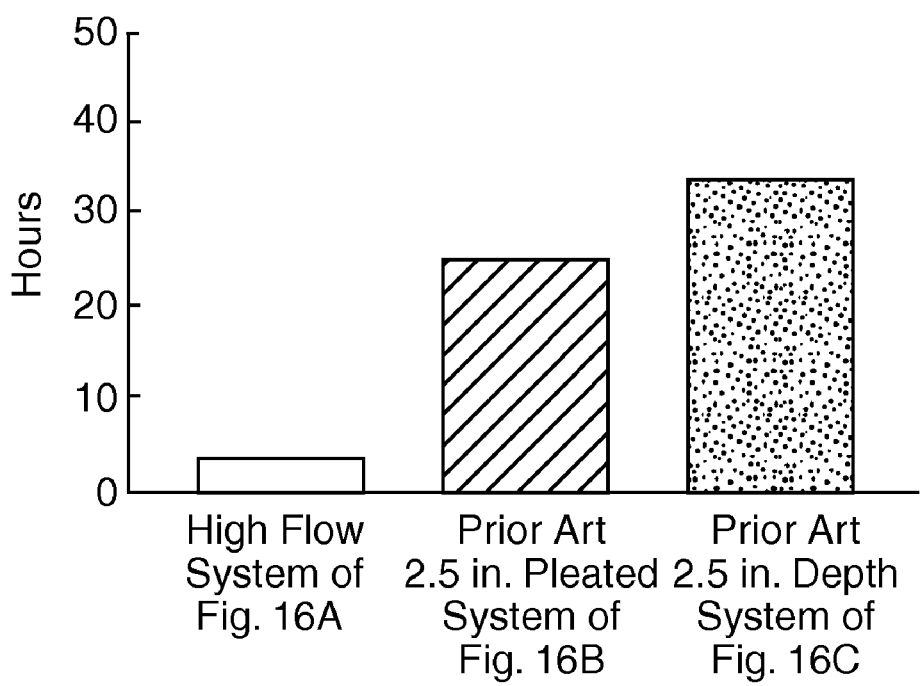
FIG. 17B is a graph illustrating the typical time/labor for filter cartridges of FIGS. 16A-16C operating at about 2000 gpm (7571 lpm).

FIGS. 17A and 17B illustrates the time/labor for change out of the cartridge filters for the various examples described above. As can be seen, in each example illustrated, the typical time/labor required for filter cartridge change out is at least half (50%) less than the competitive 2.5 inch cartridge systems illustrated.

Cartridge/Housing Locking Mechanism

The herein described high flow filtration system 50 may be designed with ease-of-use in mind. Specifically, examples of ease-of-use features include, but are not limited to, a user-friendly, ergonomically designed handle 140, that makes filter cartridge installation and removal relatively easier than in many known systems without the use of tools or other hardware and to a "twist-to-lock" ramped filter cartridge sealing mechanism 148 that ensures positive seal between the high flow filter cartridge 54 and the plug base 150 of the filter cartridge housing 52, as will be discussed in more detail below.

Figure 14:
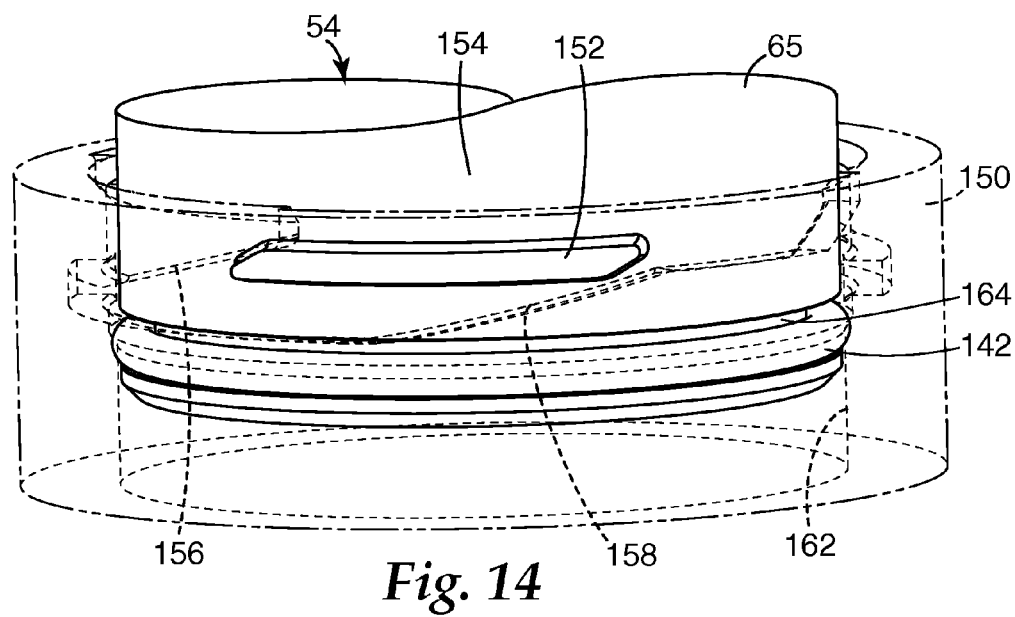
FIG. 14 is a partial cross-sectional view and a partial perspective view of an exemplary cartridge/housing locking mechanism.

As illustrated in FIG. 14, an embodiment of an exemplary high flow filter cartridge 54 of the present disclosure includes, among other components, an open end cap 65 having a sealing o-ring 142, and includes two or more locking lugs 152, 154 on the circumference thereof for guiding the high flow filter cartridge 54 into the plug base 150 positioned in a high flow filter cartridge housing 52 (See FIG. 1).

One exemplary embodiment of a high flow filter cartridge housing 52 of the present disclosure comprises a plug base 150 with an angled ramp feature, two or more ramps 156, 158, (not shown) permanently welded to the bottom plate 160 in the high flow filter cartridge housing 52, as illustrated in FIG. 1. When the open filter cartridge end cap 65 with the sealing o-ring 142 is inserted into the plug base 150 of the high flow filter cartridge housing 52, the filter cartridge open end cap 65 lines-up with the angled ramp 156 of the filter cartridge housing 52. As the high flow filter cartridge 54 is turned, for example, about a ninety degree (90°) turn, the angled ramp 156 of the high flow filter cartridge housing 52 pulls the high flow filter cartridge 54 axially into the plug base 150 resulting in the full engagement of the o-ring 142 with the plug base 150 thereby establishing a leak proof seal between the open filter cartridge end cap 65 of the filter cartridge 54 and the filter cartridge housing 52.

Exemplary o-rings believed useful with the present disclosure are available in a variety of materials, including but not limited to, the standard Buna N, ethylene propylene rubber (EPR), silicone and fluoroelastomers, for example as a product available from DuPont Performance Elastomers LLC, Wilmington, Del., under the tradename VITON.

It is believed that when the filter cartridge 54 has been installed in the high flow filter cartridge housing 52 for a long period of time (for example, depending upon the specific application, a cartridge could be installed in the filter housing for as little as about one week to about three months and even longer in some cases), the o-ring 142 sets with the o-ring sealing surface 162 of the plug base 150, as is known by those skilled in the art. Once this o-ring/plug base set occurs a relatively higher force is needed to remove the filter cartridge 54 from the filter cartridge housing 52 due to the relatively high friction between the o-ring sealing surface 162 of the plug base 150 and the o-ring 142 than the force that would have been needed had the filter cartridge been removed from the filter cartridge housing 52 prior to the o-ring/plug base set occurring.

It has been observed that, as the high flow filter cartridge 54 is turned, the o-ring 142 does not turn relative to the o-ring sealing surface 162 of the plug base 150 but travels axially reducing the torque needed for effectuating disengagement of the high flow filter cartridge 54 from the filter housing plug base 150 thereby facilitating the removal of the high flow filter cartridge 54 from the high flow filter cartridge housing 52 and the replacement thereof. It has been found that the above particular arrangement needs a relatively low installation and removal torque force for the high flow filter cartridge 54 when compared to the straight push and pull design of known filter cartridges having an o-ring seal construction.

FIG. 1 illustrates one filter cartridge 54 of the present disclosure fully positioned in the plug base 150, a second filter cartridge 54 in the process of about to be positioned in or being removed from the plug base 150 and an empty plug base 150 that would be operative to receive a third filter cartridge 54 in the filter cartridge housing 52.

As the high flow filter cartridge 54 is turned in the filter cartridge housing 52, for example, counter-clockwise to disengage the high flow filter cartridge 54 from the filter housing plug base 150, the o-ring 142 binds to the filter cartridge housing o-ring sealing surface 162 of the plug base 150 while substantially simultaneously traversing relative to the surface of the o-ring groove 164 formed on the molded open filter cartridge end cap 65.

While the systems, articles, apparatus and methods for making the systems, articles and apparatus disclosed herein constitute exemplary embodiments of the disclosure, it is to be understood that the disclosure is not limited to these precise systems, articles, apparatus and methods, and that changes may be made therein without departing from the scope of the appended claims.

What is claimed is:

1. A system of manufacturing a filter cartridge comprising:
    a tube of laminated and seamed filter media;
    a media unwind mechanism, the tube of laminated and seamed filter media being operatively positioned on the media unwind mechanism;
    a mandrel having a cone-shaped staffing point operatively positioned proximate the media unwind mechanism;
    structure, operatively positioned proximate the mandrel, for feeding the tube of laminated and seamed filter media into the cone-shaped starting point of the mandrel;
    structure, operatively positioned proximate the mandrel, for pressurizing the tube of laminated and seamed filter media with a gas;
    a pleater mechanism, operatively positioned proximate the mandrel;
    at least two blade mechanisms, each blade mechanism comprising three (3) pleating blade mechanisms each comprising a pleating blade, operatively associated with the pleater mechanism, for alternately engaging the tube of laminated and seamed filter media with the at least two blade mechanisms in a filter media pleat forming area;
    structure, operatively positioned proximate the pleater mechanism, for moving newly formed pleated filter media downstream;
    structure for compressing the tube of laminated and seamed filter media radially toward the mandrel;
    structure for engaging the pleated tube of laminated and seamed filter media downstream of the filter media pleat forming area
    structure, operatively contacting the pleated tube of laminated and seamed filter media, for moving the newly formed pleated filter media downstream of the pleater mechanism
    structure, operatively positioned downstream of the pleater mechanism, for severing the newly formed pleated filter media
    a cartridge assembly station having a spindle; and
    a spin weld arm having a spin-weld chuck operatively positioned therein, the cartridge assembly station being operatively positioned proximate the mandrel.

2. A method of manufacturing a filter cartridge comprising the acts of:
    providing a tube of laminated and seamed filter media;
    providing a media unwind mechanism;
    operatively positioning the tub of laminated and seamed filter media on the media unwind mechanism;
    operatively positioning a mandrel having a cone-shaped starting point proximate the media unwind mechanism;
    feeding the tube of laminated and seamed filter media from the media unwind mechanism into the cone-shaped starting point of the mandrel;
    pressurizing the tube of laminated and seamed filter media thereby expanding the tube of laminated and seamed filter media into a substantially cylindrical shape as the tube of laminated and seamed filter media passes over the mandrel;
    operatively positioning a pleater mechanism having at least two blade mechanisms, each blade mechanism comprising at least three (3) pleating blade mechanisms each comprising a pleating blade, the pleating blades positioned at different angles for engaging the tube of laminated and seamed filter media proximate the mandrel;
    operatively engaging the expanded tube of laminated and seamed filter media with the blade mechanism to form filter media pleats in a filter media pleat forming area;
    moving the newly formed filter media pleats downstream from the filter media pleat forming area;
    compressing the formed filter media pleats radially toward the mandrel; and
    operatively positioning a filter cartridge core over a spindle on a cartridge assembly station, the filter cartridge core having perforations formed therein and an open end-cap operatively connected thereto at one end thereof.

3. The method of claim 2 wherein the at least three (3) pleating blades are operatively positioned on each pleating blade mechanism at angles between about twenty (20) and about one hundred twenty (120) degrees from one another.

4. A pleater mechanism comprising:
    at least two blade mechanisms capable of being driven in a repeating cycle in radial and axial motions, each blade mechanism comprising:
    a plate having a center adapted for operatively mounting at least three (3) pleating pleating blade mechanisms thereto, each pleating blade mechanism comprising a pleating blade, the plate being capable of moving in an axial direction, each plate being adapted for engaging filter media in a filter media pleat forming area such that the filter media is compressed radially toward a mandrel, the pleating blades all moving toward the center or away from the center of the blade mechanisms substantially simultaneously.

5. The pleater mechanism of claim 4 wherein, the pleating blades are positioned at different angles relative to the axial direction of the pleater so long as the angle is sufficient to produce distinct pleat peaks.

6. The pleater mechanism of claim 4 wherein, the angle is between about twenty (20) and about one hundred twenty (120) degrees.

7. The pleater mechanism of claim 4 wherein, the blade mechanisms are adapted to be driven in repeating cycles such that both the radial and the axial motions occur substantially simultaneously.

8. The pleater mechanism of claim 7 wherein, each repeating cycle results in the filter media being compressed and folded from its original shape into filter media pleats.

9. The pleater mechanism of claim 8 wherein each pleat formed by the pleating blades contacting the filter media being compressed and folded in at least three (3) different places, one fold being performed by each of the pleating blades moving radially toward the center of the pleater mechanism.

10. The pleater mechanism of claim 9 wherein the axial blade motion compresses the filter media and moves the filter media away from the pleater mechanism.

11. The pleater mechanism of claim 4 further comprising:
structure for providing resistance to the downstream movement of the compressed and folded filter media pleats out of the filter media pleat forming area such that the pleated filter media is sufficiently constrained from returning to its original shape immediately after passing through the pleater mechanism out of the filter media pleat forming area.

12. The pleater mechanism of claim 4 wherein, after each filter media pleat is formed, the pleating blades move up and out of the filter media and return to a filter media pleating process starting point to initiate the pleating process again.

13. The pleater mechanism of claim 4 wherein, the at least second blade mechanism is substantially identical to the first blade mechanism except that the pleating blade mechanisms on the second blade mechanism are oriented at angles of about zero (0) degrees to about eighty nine (89) degrees from those on the first blade mechanism.

14. The pleater mechanism of claim 4 wherein, the at least second blade mechanism is substantially identical to the first blade mechanism except that the pleating blade mechanisms on the second blade mechanism are oriented about forty five (45) degrees from those on the first blade mechanism.

15. A method of making pleated filter media comprising:
moving a tube of filter media in a downstream direction over a mandrel;
positioning a pleater mechanism proximate the mandrel, the pleater mechanism comprising a first blade mechanism and a second blade mechanism, the first and second blade mechanisms each comprising at least three pleating blade mechanisms, each pleating blade mechanism comprising a pleating blade, wherein each pleating blade mechanism on each of the first and second blade mechanisms is positioned radially around the mandrel at a different angle for engaging the tube of filter media, wherein the pleating blade mechanisms on the second blade mechanism are positioned at different angles than those on the first blade mechanism;
applying backpressure to resist downstream movement of the filter media;
engaging the tube of filter media with the first blade mechanism; and
engaging the tube of filter media with the second blade mechanism to form diamond pattern pleats in the filter media.

16. The method of claim 15 further comprising pressurizing the filter media to expand it into a substantially cylindrical shape as the filter media passes over the mandrel.

17. The method of claim 15 wherein engaging the tube of filter media with the first blade mechanism to form diamond pattern pleats in the filter media comprises:
moving the pleating blades of the first blade mechanism radially toward the mandrel to fold the filter media; and
moving the first blade mechanism downstream to compress the folded filter media.

18. The method of claim 15 wherein engaging the tube of filter media with the first blade mechanism to form diamond pattern pleats in the filter media comprises:
moving the pleating blades of the first blade mechanism radially toward the mandrel to fold the filter media; and
moving the first blade mechanism downstream to compress the folded filter media; and
wherein engaging the tube of filter media with the second blade mechanism to form diamond pattern pleats in the filter media comprises:
moving the pleating blades of the second blade mechanism radially toward the mandrel to fold the filter media; and
moving the second blade mechanism downstream to compress the folded filter media.

19. A method of making pleated filter media comprising:
moving a tube of filter media in a downstream direction over a mandrel;
applying backpressure to resist downstream movement of the filter media;
moving at least three pleating blades of a first blade mechanism radially toward the mandrel to fold the filter media;
moving the first blade mechanism downstream to compress the folded filter media to form pleats;
moving at least three pleating blades of a second blade mechanism radially toward the mandrel to fold the filter media; and
moving the second blade mechanism downstream to compress the folded filter media to form pleats.

20. The method of claim 19 further comprising pressurizing the filter media to expand it into a substantially cylindrical shape as the filter media passes over the mandrel.

* * * * *

UNITED STATES PATENT AND TRADEMARK OFFICE
CERTIFICATE OF CORRECTION

| | | |
|---|---|---|
| PATENT NO. | : 7,670,528 B2 | Page 1 of 1 |
| APPLICATION NO. | : 12/048092 | |
| DATED | : March 2, 2010 | |
| INVENTOR(S) | : Mahesh Z Patel | |

It is certified that error appears in the above-identified patent and that said Letters Patent is hereby corrected as shown below:

Column 5 - Line 59 - After "2.3" insert -- . --.

Column 6 - Line 7 - Delete "a" and insert -- an --, therefor.

Column 6 - Line 56 (Approx.) - After "position;" delete "and".

Column 6 - Line 59 - After "mechanism" delete ".".

Column 9 - Line 59 - Delete "(corc)" and insert -- (core) --, therefor.

Column 10 - Line 9 - Delete "cone shaped" and insert -- cone-shaped --, therefor.

Column 17 - Line 24 (Approx.) - In Claim 1, delete "staffing" and insert -- starting --, therefor.

Column 17 - Line 66 - In Claim 2, delete "tub" and insert -- tube --, therefor.

Column 18 - Line 38 - In Claim 4, after "(3)" delete "pleatng".

Signed and Sealed this
Eleventh Day of January, 2011

David J. Kappos
*Director of the United States Patent and Trademark Office*